United States Patent [19]

Cresswell et al.

[11] Patent Number: 5,041,276

[45] Date of Patent: Aug. 20, 1991

[54] AMMONIA OXIDATION

[75] Inventors: David Cresswell, Chester; Nigel M. Sammes, Sandiway, both of England

[73] Assignee: Imperial Chemical Industries PLC, London, England

[21] Appl. No.: 468,943

[22] Filed: Jan. 23, 1990

[30] Foreign Application Priority Data

Jan. 23, 1989 [GB] United Kingdom ............... 8901406

[51] Int. Cl.$^5$ .............................................. C01B 21/26
[52] U.S. Cl. .................................... 423/404; 502/330
[58] Field of Search ......................................... 423/404

[56] References Cited

U.S. PATENT DOCUMENTS

| | | | |
|---|---|---|---|
| 1,918,957 | 7/1933 | Bray | 423/404 |
| 3,850,851 | 11/1974 | Koberstein et al. | 423/404 |
| 3,931,391 | 1/1976 | Koberstein | 423/404 |
| 4,812,300 | 3/1989 | Quinlan et al. | 423/404 |

FOREIGN PATENT DOCUMENTS

| | | |
|---|---|---|
| 0034447 | 8/1981 | European Pat. Off. . |
| 2209713 | 7/1974 | France ................... 423/404 |
| 337014 | 10/1930 | United Kingdom . |

OTHER PUBLICATIONS

Simecek et al., Effect of Potassium on the selectivity of cobalt catalysts for ammonia oxidation, Chemical Abstracts, vol. 93, p. 28678.

*Primary Examiner*—Wayne A. Langel
*Attorney, Agent, or Firm*—Cushman, Darby & Cushman

[57] ABSTRACT

Lithia doped cobalt oxide ammonia oxidation catalyst having a lithium to cobalt atomic ratio in the range 0.6 to 1.5.

6 Claims, No Drawings

AMMONIA OXIDATION

This invention relates to ammonia oxidation and in particular to a catalyst therefor.

Catalysts for oxidising ammonia, e.g. for nitric acid manufacture, generally comprise noble metals such as platinum, often employed in the form of a gauze formed from metal wires. It has also been proposed to employ cobalt oxide for this application. In particular, the cobalt oxide, $Co_3O_4$, doped with small amounts of promoters has been proposed. Thus, US-A-3850851 discloses the use of this cobalt oxide doped with 0.1 to 10 atom % of lithia (lithium oxide, $Li_2O$), and wherein such catalysts are shown to be more stable, and less prone to sintering than those which are not so doped.

We have found that when cobalt oxide doped with much larger quantities of lithia is used as a catalyst in an ammonia oxidation reaction an unexpected improvement in the selectivity of the catalyst occurs.

Accordingly the present invention provides an ammonia oxidation process wherein the ammonia in a flow of a reactant gas comprising ammonia and free oxygen, is oxidised by said free oxygen in the presence of a catalyst, thereby forming oxides of nitrogen, said catalyst comprising cobalt oxide doped with lithia and thereby having a lithium to cobalt atomic ratio, characterised in that said lithium to cobalt atomic ratio is in the range 0.6 to 1.5.

Accordingly, the present invention further provides a catalyst suitable for use in an ammonia oxidation process, said catalyst comprising cobalt oxide doped with lithia, thereby having a lithium to cobalt atomic ratio, characterised in that said lithium to cobalt ratio is in the range 0.6 to 1.5.

Catalysts having a lithium to cobalt atomic ratio in the range 0.6 to 1.5 thus show improvements in selectivity over catalysts hitherto know. It is however preferred that the lithium to cobalt atomic ratio is in the range 0.8 to 1.2 and more particularly in the range 0.9 to 1.1.

The selectivity of a given ammonia oxidation catalyst is herein termed S and is defined as:

$$S=[NO_x]_o/([NO_x]_o+[N_2]_o-[N_2]_i)$$

where
$[NO_x]_o$ is the volume of nitrogen oxides, e.g. $NO_2$, and NO, in the outlet gas;
$[N_2]_o$ is the volume of nitrogen in the outlet gas; and
$[N_2]_i$ is the volume of nitrogen in the feed.

The selectivity is affected by a number of factors, such as the composition of the catalyst, the temperature at which the reaction is conducted, the composition of the gas undergoing the reaction, and the length of time during which the gas is in contact with the catalyst.

Another meaningful parameter against which to judge the performance of an ammonia oxidation catalyst is the relative selectivity. The relative selectivity is herein defined as the ratio of the selectivity of a given ammonia oxidation catalyst, as determined at a particular temperature, gas flowrate and gas composition to the selectivity of a conventional platinum/rhodium catalyst operated at the same gas flowrate, with sufficient conventional platinum/rhodium catalyst being present so as to achieve a contact time of about 300 ms, and the same gas composition but at a temperature at which the conventional platinum/rhodium catalyst exhibits maximum selectivity. A conventional platinum/rhodium catalyst typically comprises an alloy of 10% w/w rhodium in platinum in the form of a gauze, and exhibits a selectivity of over 0.99 at 900° C. using a reactant gas comprising a mixture of ammonia in air, with an ammonia to oxygen ratio of between 0.56 and 0.59, and a contact time of about 300 ms.

Catalysts of the present invention generally have relative selectivities of at least 1, i.e. the selectivity of the catalysts of the present invention are at least as high as the maximum selectivities achieved by conventional platinum/rhodium catalysts.

Cobalt is known to have a number of oxide forms, e.g. CoO, $Co_3O_4$. In general cobalt oxide can be represented by a formula $Co_xO_y$, wherein x and y represent the number of cobalt and oxygen atoms respectively.

The following relationship of the lithium to cobalt atomic ratio, herein termed R, to the atom percent of lithium, herein termed P and the parameters x and y, may be derived.

$$R=(1+y/x)P/(100-1.5P)$$

Usually the cobalt oxide used as a catalyst in ammonia oxidation has a formula $Co_3O_4$, i.e. x is 3, and y is 4. Thus R is given by $$R=7/3P/(100-1.5P)$$

The 0.1 to 10 atom percent of lithium as disclosed in US-A-3850851, corresponds to values of R of between 0.002 and 0.275, which are significantly less than the lower limit of 0.6 of the range as used in the present invention. Indeed the most preferred materials within the scope of the present invention have a lithium to cobalt atomic ratio of between 0.9 to 1.1. Such preferred materials thus have a lithium atom percent of between 24.4 to 27.6% and thereby conform approximately to a spinel of the form $LiCoO_2$.

The catalyst may be in the form of a powder, in which form it is particularly suited for use in a fluidised bed reactor.

Alternatively, where a conventional fixed bed reactor i employed, the catalyst is preferably in the form of shaped pieces, e.g. as formed by pelleting techniques. In a further form of this preferred embodiment the catalyst is in the form of extrudates, particularly extruded cylinders having a multiplicity of through passages, for example the shapes described in EP-A-222541. Alternatively the catalyst may be in the form of a porous foam as described in EP-A-260826.

The lithia doped cobalt oxide may be made by the techniques described in the aforesaid US-A-3850851 or by forming a mixture of finely divided lithia and cobalt oxide, or compounds that are decomposable thereto by heating, and then heating the mixture to 700°-900° C.

The ammonia oxidation may be carried out in conventional fashion e.g. by passing a mixture of ammonia and a free oxygen-containing gas, e.g. air, through a bed of the catalyst at an elevated temperature, usually in the range 700°-900° C., and at a pressure in the range from 1 to 20 bar abs. The ammonia to oxygen ratio of the mixture, wherein the free oxygen is expressed as $O_2$, is typically in the range 0.1 to 1.5. Where air is used as the free oxygen-containing gas, the ammonia concentration is preferably less than about 10% by volume in order to avoid the formation of explosive mixtures. The concentration of 10% v/v of ammonia in air therefore gives rise to an ammonia to oxygen ratio of approximately 0.55.

The invention is illustrated by the following examples.

EXAMPLE 1

A series of lithia doped cobalt oxide catalysts were made by adding lithium carbonate and cobalt oxide ($Co_3O_4$) in the required proportions to triple distilled de-ionised water. The water was then boiled off until a slurry was formed. The slurry was then dried at 110° C. for 24 hours. The resultant powder was then fired in a platinum crucible at 900° C. for 3 hours. The fired product was then ball milled for 2 days.

The resultant catalysts were tested for ammonia oxidation by placing about 0.7 g of the catalyst in a reactor and passing a reaction gas, comprising 90% v/v air and 10% v/v ammonia at a rate of 1 liter per minute through the catalyst bed at atmospheric pressure and an inlet temperature of 700° C. The outlet gas was analysed using gas chromatography and the selectivity, S, determined.

The ammonia oxidation was also performed at an inlet temperature of 800° C. The results were as shown in the following table.

| Li/Co ratio (atomic) | Selectivity 700° C. | 800° C. |
|---|---|---|
| 0.33* | 0.89 | 0.71 |
| 0.64 | 0.89 | 0.73 |
| 0.97 | 0.98 | 0.86 |
| 1.62* | 0.61 | 0.60 |

*comparative examples

The catalyst having a lithium to cobalt atomic ratio of 0.97 was thus shown to have the highest selectivity.

EXAMPLE 2

In this example, a range of catalysts was prepared in which the lithium was added by impregnation of cobalt oxide with lithium nitrate solution. The impregnated cobalt oxide was then dried at 120° C., and the lithium nitrate decomposed to the oxide by heating to 750° C. for 12 hours.

The catalyst was then tested in a "pulse" type reactor. A sample of catalyst 4mm in depth was supported on quartz wool in a reactor of 10 mm inside diameter. The temperature of the sample was increased to, and maintained at 800° C. An inert gas stream (helium) was passed though the sample at a rate of 2.18 liters per minute per square centimeter of flow area. A pulse of 5 ml of a reaction gas consisting of 10% v/v ammonia, 20% v/v oxygen and 70% v/v helium was then injected into the inert gas stream flowing through the sample. The change in the nitrogen oxide content of the gas exit the sample was monitored by mass spectroscopy.

A conventional platinum/rhodium catalyst was used in a similar "pulse" type reactor, but was maintained at the temperature at which maximum selectivity was exhibited for the conventional catalysts i.e. about 900° C. The change in nitrogen oxide content of the gas exit the sample was again monitored by mass spectroscopy.

The relative selectivity of the lithia doped catalyst was derived from the ratio of the area of the trace for the change in nitrogen oxide content obtained when using the lithia doped catalyst to that obtained when using the conventional catalyst.

| Li/Co ratio (atomic) | Relative Selectivity @ 800° C. |
|---|---|
| 0.00* | 0.84 |
| 0.06* | 0.89 |
| 0.11* | 0.90 |
| 0.31* | 0.94 |
| 0.66 | 1.01 |
| 1.07 | 1.06 |
| 1.48 | 1.00 |

*comparative examples

It is thus evident that catalysts according to the present invention are capable of greater selectivity than conventional platinum/rhodium catalysts.

EXAMPLE 3

In this example further samples of the catalyst as formed in Example 1, and having a lithium to cobalt atomic ratio of 0.97, were tested for ammonia oxidation at differing ammonia to oxygen ratios.

The conditions for the testing of the samples were similar to those of Example 1, except that a 2% v/v oxygen in nitrogen mixture was passed through the sample of catalyst at a flowrate of 1 liters per minute, and the appropriate amount of ammonia was introduced into the gas mixture.

The results are shown in the following table.

| Ammonia to Oxygen ratio | Selectivity 700° C. | 800° C. |
|---|---|---|
| 0.5 | 0.97 | 1.00 |
| 0.75 | 0.95 | 0.97 |
| 1.0 | 0.95 | 0.95 |
| 1.5 | 0.84 | 0.80 |

It is seen that this material is very highly selective over a wide range of ammonia to oxygen ratios.

EXAMPLE 4

In this example the catalyst was prepared using equimolar proportions of lithium carbonate and cobalt oxalate, which were ball milled for 24 hours in ethanol and then the resultant mixture was fired in air at 900° C. for 11 hours. The resulting material had a composition approximating to a spinel, $LiCoO_2$, as shown by XRD.

This material was tested using a gas mixture of 10% v/v oxygen in helium, with the addition of ammonia at the level required to achieve the various ammonia to oxygen ratios. The total flowrate of gas to the sample was maintained at 0.1 liters per minute, so as to achieve a contact time with the catalyst sample of 425 mS. The results are shown in the following table:

| Ammonia to Oxygen ratio | Selectivity 700° C. | 800° C. |
|---|---|---|
| 0.5 | 0.72 | 0.95 |
| 0.75 | 0.61 | 0.96 |
| 1.0 |  | 0.58 |
| 1.5 |  | 0.50 |

We claim:

1. In a process for the oxidation of ammonia comprising i) mixing an ammonia gas stream with a free oxygen-containing gas stream so as to form a reactant stream;

ii) contacting a flow of said reactant stream with a catalyst suitable for catalysing the oxidation of said ammonia in said reactant stream, and thereby forming an outlet gas stream containing oxides of nitrogen; and wherein said catalyst comprises cobalt oxide doped with lithia and thereby having a lithium to cobalt atomic ratio the improvement that said lithium to cobalt atomic ratio is in the range 0.6 to 1.5.

2. A process as claimed in claim 1 wherein said lithium to cobalt atomic ratio is in the range 0.9 to 1.1.

3. A process as claimed in claim 1, wherein said catalyst has a selectivity, S, as defined as $$S = [NO_x]_o / ([NO_x]_o + [N_2]_o - [N_2]_i)$$

where $[NO_x]_o$ is the volume of nitrogen oxides present in outlet gas stream;

$[N_2]_o$ is the volume of nitrogen present in said out gas stream; and $[N_2]_i$ is the volume of nitrogen present in said reactant stream and said selectivity is at least as high as the selectivity of a wire gauze as determined when sufficient of said wire gauze, to obtain a contact time of 300 ms with said flow of said reactant stream, is used to catalyse the oxidation of the ammonia in said reactant stream at a temperature at which said wire gauze exhibits maximum selectivity, said wire gauze comprising a rhodium/platinum alloy containing 10% rhodium, and which when used to catalyse the oxidation of the amounts in a flow of a mixture of amounts in air, said mixture having an ammonia to air ratio in the range 0.56 to 0.59, at a temperature of 900° C. and a contact time of 300 ms, has a selectivity of at least 0.99.

4. A process as claimed in claim 1 wherein at least some of the lithium in said catalyst is in the form of a spinel, and said spinel has the form $LiCoO_2$.

5. A process as claimed in claim 1 wherein said reactant stream is contacted with said catalyst at a temperature in the range 700° to 900° C., and at a pressure in the range 1 to 20 bar absolute.

6. An ammonia oxidation process as claimed in claim 1 wherein the ratio of the volume of ammonia to the volume of free oxygen in said reactant stream is in the range 0.1 to 1.5.

* * * * *